3,232,076
FLEXIBLE COUPLING FOR ROTATING SHAFTS
Edward V. Sundt, 1 Woodly Manor, Winnetka, Ill.
Filed Dec. 31, 1962, Ser. No. 248,465
4 Claims. (Cl. 64—11)

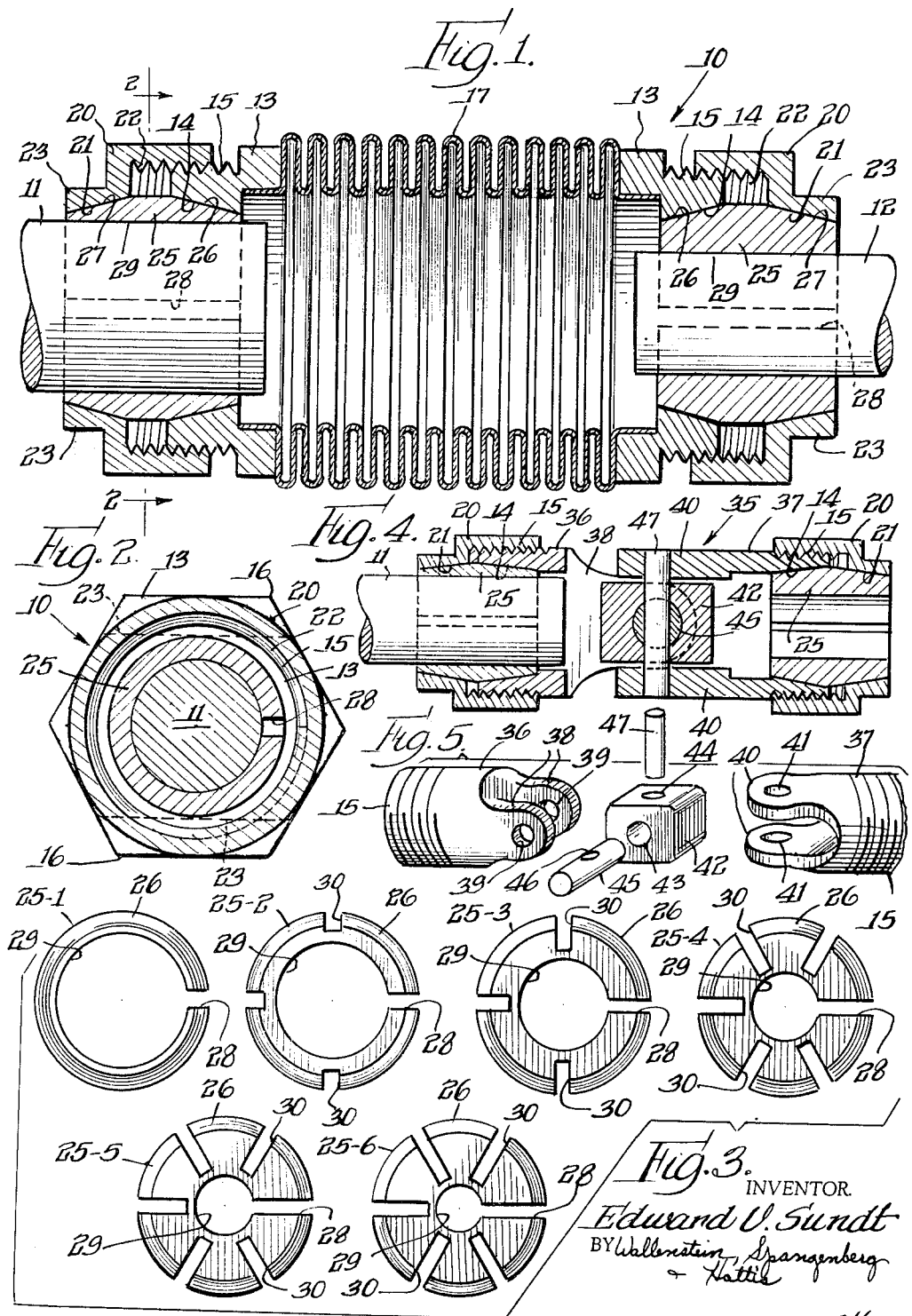

In making tests, such as torque and power tests and the like, in laboratories and the like, the need often arises for a convenient means for rotatably coupling shafts, for example, coupling motor shafts to torque meter shafts, motor shafts to gear train shafts, tachometer shafts to journals, and shafts of innumerable components that require testing. To accomplish this in an efficient manner, quick, accurate and temporary mechanical coupling connections are desirable. Furthermore, the various shafts to be coupled usually have various diameters and accurate alignment of the shafts is not always possible and these factors must also be taken into consideration.

The principal object of this invention is to provide a flexible coupling for readily rotatably coupling shafts, wherein the shafts may be of various diameters, wherein the shafts may be misaligned, and wherein quick, accurate and temporary mechanical coupling is accomplished.

Briefly, the coupling means of this invention includes a pair of end fittings having internal surfaces and a flexible coupling means connected between the inner ends of the end fittings for rotatably coupling together the end fittings but permitting misalignment thereof. A pair of collet nuts having internal surfaces are screw threadedly carried by the outer ends of the end fittings. The coupling means further includes a plurality of split collets having central holes of various diameters for use with shafts of various diameters. The split collets also have external surfaces corresponding to the internal surfaces of the end fittings and the collet nuts. The internal surfaces of the end fittings and collet nuts and the external surfaces of the collets form camming means for compressing the split collets.

The shafts to be coupled are received in the central holes of appropriately selected ones of said split collets with the external surfaces of the split collets engaging the internal surfaces of the end fittings and collet nuts. When the collet nuts are screw threadedly drawn tight to the end fittings, the camming means formed by the internal surfaces of the end fittings and collet nuts and the external surfaces of the split collets compress and clamp the split collets to the shafts for rotatably coupling together the shafts. Preferably, at least those split collets which have central holes of smaller diameter are provided with a plurality of radially extending slots to facilitate compression of said split collets. Thus, the flexible coupling of this invention readily provides a quick, accurate and temporary mechanical coupling between rotating shafts which may be of various diameters and which may be misaligned, a coupling which is particularly suitable for test work and the like as expressed above.

The flexible coupling means between the inner ends of the end fittings may take various forms. For example, for transmitting light torque loads the flexible coupling means preferably includes a resilient bellows connected between the inner ends of the end fittings. For transmitting heavy loads the flexible coupling means preferably includes a universal coupling means having a spider means, first pivot means for pivoting the spider means to the inner end of the one end fitting, and a second pivot means normal to said first pivot means for pivoting the spider means to the inner end of the other end fitting. Also, preferably, at least some of the means of the universal coupling means are lubricant impregnated to make the coupling means self lubricating.

Further objects of this invention reside in the details of construction of the flexible coupling and in the cooperative relationships between the component parts thereof.

Other objects and advantages will become apparent to those skilled in the art upon reference to the accompanying specifications, claims and drawing in which:

FIG. 1 is a sectional view through one form of the flexible coupling of this invention for rotatably coupling shafts of different diameters together;

FIG. 2 is a vertical sectional view taken substantially along the line 2—2 of FIG. 1;

FIG. 3 is a composite view illustrating a plurality of collets having central holes of different diameters which may be selectively utilized in the flexible coupling of FIG. 1 for coupling together shafts of various diameters;

FIG. 4 is a sectional view on a reduced scale through another form of the flexible coupling of this invention; and FIG. 5 is an exploded perspective view of a portion of the flexible coupling of FIG. 4.

Referring first to FIGS. 1 and 2, one form of the flexible coupling of this invention is generally designated at 10 and it is shown as rotatably coupling together shafts 11 and 12 which may be of different diameters and which may be misaligned. The flexible coupling 10 includes a pair of end fittings 13. The outer ends of the end fittings 13 have outwardly facing frusto-conical openings 14 and the outer ends of the end fittings 13 are also provided with external screw threads 15 which are concentric with the frusto-conical openings 14. Adjacent their inner ends the end fittings 13 are provided with a hexagonal configuration indicated at 16 in FIG. 2 so as to facilitate the assembly of the flexible coupling 10 to the shafts 11 and 12. A flexible coupling means is connected between the inner ends of the end fittings 13 for rotatably coupling together the end fittings but permitting misalignment thereof. This coupling means in the form of the invention illustrated in FIGS. 1 and 2 comprises a resilient bellows 17 which is secured at its ends to the inner ends of the end fittings 13. The end fittings 13 may be formed of prehardened stainless steel and the flexible bellows may also be formed of stainless steel or phosphor bronze, beryllium, copper, or the like. The ends of the flexible bellows 17 may be secured to the inner ends of the end fittings 13 by hard soldering or the like.

The flexible coupling also includes a pair of collet nuts 20 which may be formed of hardened aluminum or the like to provide a lightweight construction. The outer ends of the collet nuts 20 are provided with inwardly facing frusto-conical openings 21 and the inner ends of the collet nuts 20 are provided with internal screw threads 22 which are concentric with the frusto-conical openings 21. The frusto-conical openings 21 and the internal screw threads 22 of the collet nuts 20 correspond to the frusto-conical openings 14 and the external screw threads 13 of the end fittings 13, the collet nuts 20 being screw threadedly carried by the end fittings 13. The exteriors of the collet nuts 22 are preferably knurled and the outer ends of the collet nuts 20 may be provided with flats 23 for facilitating drawing up of the collet nuts 20 onto the end fittings 13.

The flexible coupling of this invention also includes a plurality of split collets 25 having a split 28 throughout the lengths thereof. The plurality of split collets 25 are provided with central holes 29 of various diameters for use with shafts of various diameters. The split collets are also provided with external opposed frusto-conical surfaces 26 and 27 which correspond respectively to the frusto-conical openings 14 in the end fittings 13 and the frusto-conical openings 21 in the collet nuts 20. These frusto-conical surfaces 26 and 27 on the split collets 25 and the frusto-conical openings 14 and 21 in the end fittings 13 and the collet nuts 21 form camming means for compressing the split collets 25 and clamping the same to the shafts 11 and 12.

The plurality of split collets 25 having central holes of different diameters are illustrated in FIG. 3, these split collets being designated 25–1 to 25–6 in accordance with the diameters of the central holes 29 thereof. As shown, there are split collets having six different diameter central holes 29 therein and in a set of split collets there are preferably two split collets of each size. As an example, the split collets 25–1 may have a ⅜ inch diameter central hole, the split collets 25–2 a ⁵⁄₁₆ inch diameter central hole, the split collets 25–3 a ¼ inch diameter central hole, the split collets 25–4 a ³⁄₁₆ inch diameter central hole, the split collets 25–5 a ⁵⁄₃₂ inch diameter central hole and the split collets 25–6 a ⅛ inch diameter central hole for use with shafts of those diameters. The various sized split collets may be formed of cadmium plated hardened alloid steel or of bright nicked plated beryllium copper or the like, the split collets preferably being hardened.

In assemblying the flexible coupling to the shafts 11 and 12, the shafts are received in the central holes 29 of appropriately selected ones of the split collets 25 with the external frusto-conical surfaces 26 and 27 engaging the internal frusto-conical openings 14 and 21 of the end fittings 13 and the collet nuts 20. When the collet nuts 20 are screw threadedly drawn tight on the end fittings 13, the camming means formed by the internal frusto-conical surfaces 14 and 21 of the end fittings 13 and collet nuts 20 and the external frusto-conical surfaces 26 and 27 of the split collets compress and clamp the split collets 25 to the shafts 11 and 12 for rotatably coupling together these shafts. Preferably, at least those split collets 25–2 to 25–6, which have central holes 29 of smaller diameter, are provided with a plurality of radially extending slots 30 to decrease the effective wall thickness of the split collets 25 to facilitate compression of said split collets 25 and clamping of the same to the shafts 11 and 12. From the foregoing it is seen that the flexible coupling 10 of this invention readily provides a quick, accurate and temporary coupling between the rotating shafts 11 and 12 which may be of various diameters and which may be misaligned. The flexible coupling 10 of this invention is, therefore, particularly suitable for test work and the like as expressed above.

Referring now to FIGS. 4 and 5, another form of the flexible coupling of this invention is generally designated at 35. It includes a pair of end fittings 36 and 37 which are provided at their outer ends with outwardly facing frusto-conical openings 14 and screw threads 15 for cooperating with the split collets 25 and the collet nuts 20 for securing the end fittings 36 and 37 to the shafts 11 and 12 as discussed above in connection with the flexible couplings 10 of FIGS. 1 to 3. In this respect, like reference characters have been utilized for like parts. The flexible coupling 35 differs from the flexible coupling 10 in the flexible coupling means between the end fittings 36 and 37. Here, the inner end of the end fittings 36 is provided with a pair of spaced apart ears 38 having aligned holes 39 and the inner end of the end fitting 37 is provided with a pair of spaced apart ears 40 having aligned holes 41. The flexible coupling means includes a spider means 42 having a relatively large diameter hole 43 and a relatively small diameter hole 44 extending therethrough, the holes 43 and 44 being normal to each other. A pin 45 having a transverse hole 46 therein extends through the holes 39 in the ears 38 and the hole 43 in the spider means 42 for pivotally mounting the spider means 42 on the inner end of the end fittings 36. Another pin 47 extends through the holes 41 of the ears 40, the hole 44 of the spider means 42 and the hole 46 in the pin 45 for pivotally mounting the spider means 42 on the inner end of the end fitting 37. The spider means 42 and the pivot means 45 and 47, therefore, form a flexible coupling between the end fittings 36 and 37 which is in the form of a universal coupling means. Thus, the flexible coupling 35 of this form of the invention also readily provides a quick, accurate and temporary mechanical coupling between the rotating shafts 11 and 12 which may be of various diameters and which may be misaligned. The flexible coupling 35 of FIGS. 4 and 5 is particularly suited for transmitting relatively heavy torque loads.

In the operation of the flexible coupling means 35, the pin 47 is rigidly secured to the ears 40 so that the pin 47 oscillates in the spider means 42, and the pin 45 which is held against oscillation in the spider means 42 by the pin 47 oscillates in the ears 38. The spider means 42 and the pin 45 may be formed of suitable porous materials, such as bronze or the like, impregnated with a suitable lubricant material, such as oil or graphite or the like, so as to make the universal coupling means self lubricating.

While for purposes of illustration two forms of this invention have been disclosed, other forms thereof may become apparent to those skilled in the art upon reference to this disclosure and, therefore, this invention is to be limited only by the scope of the appended claims.

I claim as my invention:

1. A flexible coupling for readily rotatably coupling shafts of different diameters comprising, a pair of end fittings, flexible coupling means connected between the inner ends of the end fittings for rotatably coupling together the end fittings but permitting misalignment thereof, a pair of collet nuts screw threadedly carried by the outer ends of the end fittings, and a plurality of split collets having central holes of various diameters for use with shafts of various diameters and external camming means cooperating with the end fittings and the collet nuts for compressing the collets, the shafts being received in the central holes of appropriately selected ones of said split collets with the split collets between the end fittings and the collet nuts and with the camming means of the collets compressing and clamping the split collets to the shafts, when the collet nuts are screw threadedly drawn tight to the end fittings, for rotatably coupling together the shafts.

2. A flexible coupling for readily rotatably coupling shafts of different diameters comprising, a pair of end fittings having internal surfaces, flexible coupling means connected between the inner ends of the end fittings for rotatably coupling together the end fittings but permitting misalignment thereof, a pair of collet nuts screw threadedly carried by the outer ends of the end fittings and having internal surfaces, and a plurality of split collets having central holes of various diameters for use with shafts of various diameters and external surfaces corresponding to the internal surfaces of the end fittings and collet nuts, the internal surfaces of the end fittings and collet nuts and the external surfaces of the collets forming camming means for compressing the split collets, the shafts being received in the central holes of appropriately selected ones of said split collets with the external surfaces of the split collets engaging the internal surfaces of the end fittings and collet nuts and with the camming means formed by said surfaces compressing and clamping the split collets to the shafts, when the collet nuts are screw threadedly drawn tight to the end fittings, for rotatably coupling together the shafts.

3. A flexible coupling for readily rotatably coupling shafts of various diameters comprising, a pair of end fittings having outwardly facing frusto-conical openings in the outer ends thereof and external screw threads adjacent the outer ends thereof concentric with the frusto-conical openings, flexible coupling means connected between the inner ends of the end fittings for rotatably coupling together the end fittings but permitting misalignment thereof, a pair of collet nuts having inwardly facing frusto-conical openings in the outer ends thereof and internal screw threads adjacent the inner ends thereof concentric with the frusto-conical openings, the frusto-conical openings and the internal screw threads of the collet nuts corresponding to the frusto-conical openings and the external screw threads of the end fittings, and a plurality of split collets having external opposed frusto-conical surfaces corresponding to the frusto-conical openings of the end fittings and the collet nuts and central holes concentric with the frusto-conical surfaces thereof of various diameters for use with shafts or various diameters, the shafts being received in the central holes of appropriately selected ones of said split collets with the frusto-conical surfaces of the split collets engaging the frusto-conical openings of the end fittings and collet nuts and with the internal screw threads of the collet nuts and the external screw threads of the end fittings in engagement and drawn tight to compress and clamp the split collets to the shafts for rotatably coupling together the shafts.

4. A flexible coupling for readily rotatably coupling shafts of different diameters comprising, a pair of end fittings, flexible coupling means connected between the inner ends of the end fittings for rotatably coupling together the end fittings but permitting misalignment thereof, a pair of collet nuts screw threadedly carried by the outer ends of the end fittings, and a plurality of split collets having central holes of various diameters for use with shafts of various diameters and external surfaces of uniform dimensions provided with camming means cooperating with the end fittings and the collet nuts for compressing the collets, at least the split collets having central holes of smaller diameter being provided with a plurality of radially extending slots to facilitate compression of said split collets, the shafts being received in the central holes of appropriately selected ones of said split collets with the split collets between the end fittings and the collet nuts and with the camming means of the collets compressing and clamping the split collets to the shafts, when the collet nuts are screw threadedly drawn tight to the end fittings, for rotatably coupling together the shafts.

References Cited by the Examiner

UNITED STATES PATENTS

| | | | |
|---|---|---|---|
| 753,439 | 3/1904 | Sinclair | 287—116 |
| 823,944 | 6/1906 | Hart | 287—116 |
| 1,108,567 | 8/1914 | Fox | 64—17 |
| 1,140,978 | 5/1915 | Hart | 287—116 |
| 1,216,445 | 2/1917 | Harrington et al. | 64—17 |
| 1,752,106 | 3/1930 | Persons | 64—13 |
| 2,295,316 | 9/1942 | Yates | 64—11 |
| 2,369,810 | 2/1945 | Stillwagon | 64—17 |
| 3,020,737 | 2/1962 | Firth | 64—13 |

FOREIGN PATENTS 292,332  6/1928  Great Britain.

BROUGHTON G. DURHAM, *Primary Examiner.*

FRANK SUSKO, ROBERT C. RIORDON, *Examiners.*